United States Patent
Choo

(10) Patent No.: US 7,345,857 B2
(45) Date of Patent: Mar. 18, 2008

(54) POWER SUPPLY WITH SURGE VOLTAGE CONTROL FUNCTIONS

(75) Inventor: Jong-yang Choo, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 410 days.

(21) Appl. No.: 10/768,052

(22) Filed: Feb. 2, 2004

(65) Prior Publication Data

US 2004/0156160 A1 Aug. 12, 2004

(30) Foreign Application Priority Data

Feb. 10, 2003 (KR) ............ 10-2003-0008342

(51) Int. Cl.
*H02H 9/00* (2006.01)
(52) U.S. Cl. ............................................. 361/18
(58) Field of Classification Search ............ 361/18
See application file for complete search history.

(56) References Cited

U.S. PATENT DOCUMENTS

| | | | | |
|---|---|---|---|---|
| 3,539,898 A | * | 11/1970 | Tolmie | 320/115 |
| 4,001,637 A | * | 1/1977 | Gray | 315/205 |
| 4,481,555 A | * | 11/1984 | Yoshida et al. | 361/155 |
| 4,575,668 A | * | 3/1986 | Baker | 318/811 |
| 4,887,199 A | * | 12/1989 | Whittle | 363/49 |
| 5,534,768 A | * | 7/1996 | Chavannes et al. | 323/267 |
| 5,661,348 A | * | 8/1997 | Brown | 307/43 |
| 5,812,385 A | * | 9/1998 | Leu | 363/49 |
| 6,229,681 B1 | * | 5/2001 | Lee | 361/92 |
| 6,427,061 B1 | * | 7/2002 | Miura et al. | 399/336 |
| 2002/0191359 A1 | * | 12/2002 | Chen | 361/58 |

FOREIGN PATENT DOCUMENTS

| | | | | |
|---|---|---|---|---|
| JP | 54113039 | A | * | 9/1979 |
| JP | 59148574 | A | * | 8/1984 |
| JP | 63077383 | A | * | 4/1988 |
| JP | 01305918 | A | * | 12/1989 |

(Continued)

OTHER PUBLICATIONS

-The Official Action issued by the Korean Intellectual Property Office on Feb. 3, 2005, and Listing 1 reference.

(Continued)

*Primary Examiner*—Michael Sherry
*Assistant Examiner*—Ann T. Hoang
(74) *Attorney, Agent, or Firm*—Stanzione & Kim, LLP

(57) ABSTRACT

A power supply with surge voltage control functions. The power supply has a rectifying unit rectifying a voltage of an AC power source externally applied; a fuse resistor inputting and applying the AC power source to the rectifying unit, and cutting off the voltage of the AC power source exceeding a predetermined value; a pulse generation unit driven by an output voltage of the rectifying unit, and generating a pulse having a predetermined period; a transformer driven by the pulse, and inducing a predetermined ac voltage; and a surge voltage control unit turning on by an ac voltage induced by the transformer to form a current path between the AC power source and the rectification unit, wherein the current path is formed between the AC power source and the rectifying unit via the fuse resistor when the output voltage of the rectifying unit exceeds a predetermined value.

22 Claims, 3 Drawing Sheets

FOREIGN PATENT DOCUMENTS

| | | | | |
|---|---|---|---|---|
| JP | 3-63086 | | | 6/1991 |
| JP | 05030650 | A | * | 2/1993 |
| JP | 06217448 | A | * | 8/1994 |
| JP | 07107664 | A | * | 4/1995 |
| JP | 09205740 | A | * | 8/1997 |
| JP | 11235030 | A | * | 8/1999 |
| JP | 11243686 | A | * | 9/1999 |
| JP | 2000134919 | A | * | 5/2000 |
| JP | 2002078344 | A | * | 3/2002 |
| JP | 2005057947 | A | * | 3/2005 |
| JP | 2005274886 | A | * | 10/2005 |
| KR | 1998-056288 | | | 9/1998 |

OTHER PUBLICATIONS

Chinese Office Action dated Feb. 16, 2007 issued in CN2004100352914.

* cited by examiner

POWER SUPPLY WITH SURGE VOLTAGE CONTROL FUNCTIONS

CROSS-REFERENCE TO RELATED APPLICATIONS

This application claims the benefit of Korean Patent Application No. 2003-8342 filed Feb. 10, 2003, in the Korean Intellectual Property Office, the disclosure of which is incorporated herein by reference.

BACKGROUND OF THE INVENTION

1. Field of the Invention

The present invention relates to a power supply, and more particularly to a power supply with surge voltage control functions minimizing a power supply loss.

2. Description of the Related Art

In general, AC power sources provide a voltage of 110V or 220V. Korea and Europe uses AC power sources supplying a voltage of 220V, whereas United States of America and Japan use AC power sources supplying a voltage of 110V. Accordingly, a power supply built into electronic devices is generally provided with a voltage selection switch to select 110V or 220V as an input voltage thereto.

In the meantime, on occasions when an electronic device normally used in an area with the AC power source of 110V is used in an area with 220V, users usually forget about manipulating the voltage selection switch provided on the power supply, which often causes severe damage to the power supply due to an excessive voltage supplied thereto, or causes the power supply to output unstable voltages or operate in a malfunctioning state due to shocks applied thereto even though the power supply is not broken down.

FIG. 1 shows a detailed circuit of a conventional power supply.

The power supply shown in FIG. 1 has a fuse 10 connected in series to an AC input terminal AC1, an LC filter 20 connected to the fuse 10 and another AC input terminal AC2, and a rectifier 30 to rectify an output voltage of the LC filter 20.

The fuse 10 is electrically open-circuited when an AC input source supplies a voltage over a certain potential level, to thereby protect the power supply. The power supply usually has voltage characteristics to withstand 250V in countries supplying 220V through the AC power source, and also has diverse current capacities depending upon electronic devices in which it is built.

The LC filter 20 eliminates noise included in the AC power source. The frequency of the AC power source ranges from 50 Hz to 60 Hz, and the LC filter 20 eliminates frequencies lower or higher than this frequency range.

The rectifier 30 rectifies and converts into a dc voltage a voltage of the AC power source filtered through the LC filter 20. The rectifier 30 full-wave-rectifies, through a bridge diode 31, a voltage of the AC power source that is temperature-compensated by a thermistor 33, smoothes the rectified voltage through a capacitor 32, and converts the smoothed voltage into a complete dc voltage. At this time, an electrolytic capacitor having excellent low-frequency characteristics is usually used for the capacitor 32.

The thermistor 33 is an element that lowers its resistance value as an ambient temperature rises, which limits an electric current that is applied to the bridge diode 31 before the power supply reaches a steady state. If the power supply reaches the steady state, the power supply usually radiates a certain amount of heat, and the resistance value of the thermistor 33 is set to have an optimum value when the power supply has a predetermined temperature in the steady state. Accordingly, before the power supply reaches the steady state, excessive current is prevented from flowing into the bridge diode 31.

In the meantime, the electrolytic capacitor 32 is a capacitor formed with a metal film and a dielectric layer inserted in electrolyte, and explodes if a voltage outputted from the rectifier 30 exceeds the voltage that the power supply can withstand, and, when exploded, the electrolyte splashes over the circuit components constituting the power supply.

Since the electrolyte is electrically conductive, the splashed electrolyte short-circuits neighboring circuit components, thereby breaking down the power supply. Further, a dc voltage smoothed through the electrolytic capacitor 32 applies stress on the power supply just before the electrolytic capacitor 32 explodes, which deteriorates electric characteristics of the circuit components constituting the power supply.

FIG. 2 is a circuit diagram showing a power supply protection device formed at an input stage of another conventional power supply.

The power supply protection device shown in FIG. 2 has a varistor 50 connected to the AC input terminals AC1 and AC2, a fuse 40 connected in series to the AC input terminal AC1, an LC filter 60 connected in series and in parallel with the fuse 40 and the AC input terminal AC2, respectively, to eliminate noise included in a voltage of the AC power source.

The varistor 50 is an element that lowers its internal resistance value as a value of the voltage applied thereto increases, which forms a current path between the AC input terminals AC1 and AC2 when a potential difference therebetween increases so that an excessive voltage is not applied to the LC filter 60. In general, the varistor 50 consists of a $ZnO_2$ material of conductivity, and a surge current passes therethrough when a voltage applied thereto exceeds a predetermined voltage. At this time, if the surge current exceeds the limit capacity of the varistor 50, the varistor 50 is broken down so that the power supply can not be protected, and fragments thereof are scattered, thereby impacting on its ambient components. Further, there is a problem in that the scattered fragments cause the electric parts of the power supply to be short-circuited so that additional damage is incurred by the parts.

SUMMARY OF THE INVENTION

In order to solve the above and/or other problems, it is an aspect of the present invention to provide a power supply with surge voltage protection functions which minimize damage to circuit components thereof when a surge voltage is applied thereto.

Additional aspects and advantages of the invention will be set forth in part in the description which follows and, in part, will be obvious from the description, or may be learned by practice of the invention.

The foregoing and/or other aspects of the present invention are achieved by providing a power supply with surge voltage control functions comprising a rectifying unit to rectify a voltage of an AC power source externally applied; a fuse resistor to input and apply the AC power source to the rectifying unit and cut off the voltage of the AC power source exceeding a predetermined value; a pulse generation unit driven by an output voltage of the rectifying unit and to generate a pulse having a predetermined period; a transformer driven by the pulse and to induce a predetermined ac voltage; and a surge voltage control unit turning on by the ac voltage induced by the transformer to form a first current path between the AC power source and the rectifying unit, wherein a second current path is formed between the AC power source and the rectifying unit via the fuse resistor when the output voltage of the rectifying unit exceeds the predetermined value.

In an aspect of the present invention, the surge voltage control unit includes a voltage generator to generate a dc voltage from the ac voltage induced by the transformer; a first switch to form the first current path between the AC power source and the rectifying unit by the dc voltage received from the voltage generator 610; and a second switch to turn off the first switch when the output voltage of the rectifying unit exceeds the predetermined value and to form the second current path between the AC power source and the rectifying unit via the fuse resistor.

In another aspect of the present invention, the voltage generator includes windings formed at a secondary side of the transformer; a first diode having an anode connected to one end of one winding of the voltage generator windings; and a first resistor having one end connected to a cathode of the first diode and another end which forms a positive(+) voltage output terminal.

In another aspect of the present invention, the first switch includes a triac having an input terminal connected to the AC power source and an output terminal connected to another end of the one winding formed at the secondary side of the transformer, and a gate connected to the positive voltage output terminal; and a second resistor and a first capacitor each connected between the gate and the output terminal of the triac.

In yet another aspect of the present invention, the second switch includes a bipolar transistor having a collector connected to the gate of the triac, and an emitter connected to the output terminal of the triac; and a zener diode having an anode connected to a base of the bipolar transistor and a cathode connected to a voltage output terminal of the rectifying unit.

In still another aspect of the present invention, the second resistor is a damping resistor to consume residual current between the output terminal and the gate of the triac in a state that the triac is turned off.

Here, the first capacitor delays time at which an output voltage of the voltage generator is applied to the gate of the triac.

In yet another aspect of the present invention, the power supply further comprises LC filters provided between the AC power source and the rectifying unit, to reduce noise included in the voltage of the AC power source.

A power suppy comprising a rectifying unit to rectify an externally applied AC power source; a switching unit to apply the AC power source to the rectifying unit through a first electrical path until the AC power source exceeds a predetermined value, and then to cut off the AC power source to the rectifying unit; a pulse generation unit to generate a pulse having a predetermined period and being driven by an output voltage of the rectifying unit; a transformer driven by the generated pulse to induce a predetermined ac voltage; and a surge voltage control unit to form a second path for a current to flow from the AC power source to the rectifying unit when turned on by the induced predetermined ac voltage, the current flowing from the AC power source to the rectifying unit through the first electrical path when the output voltage of the rectifying unit exceeds the predetermined value.

In an aspect of this embodiment, the surge voltage control unit includes a voltage generator to generate a dc voltage from the ac voltage induced by the transformer a first switch to form a current path between the AC power source and the rectification unit by the dc voltage; and a second switch to turn off the first switch when the output voltage of the rectification unit exceeds the predetermined value and to form the current path between the AC power source and the rectifying unit via the switching unit.

The foregoing and/or other aspects of the present general inventive concept may also be achieved by providing a method of providing surge voltage protection to a power supply, the method including rectifying a voltage of an externally applied AC power source received through a first electrical path; cutting off the voltage of the AC power source if the voltage exceeds a predetermined value; generating a pulse of a predetermined period from the rectified voltage; inducing a predetermined ac voltage by the generated pulse; and switching the first electrical path to a second electrical path between the AC power source and the rectifying operation to provide current to the rectifying operation through the second electrical path when an output voltage of the rectifying operation exceeds a predetermined value, and returning the flow of the current from the AC power source to the rectifying operation through the first electrical path when the output voltage of the rectifying operation does not exceed a predetermined value.

The foregoing and/or other aspects of the present invention may also be achieved by providing power supply comprising a power source generating an ac voltage; a rectifier connected to the power source to convert the ac voltage to the dc voltage; a first current path line connected between the power source and the rectifier; a second current path line connected between the power source and the rectifier; and a surge voltage controller selecting one of the first current path and the second current path line as a current path from the power source to the rectifier according to the dc voltage value.

In an aspect of the above embodiment, the first current path line comprises a switch turned on and off according to the dc voltage value.

In another aspect of the above embodiment, the second current path line comprises a switch causing a voltage drop between the power source and the rectifier.

In yet another aspect of the above embodiment, the power supply further comprises a transformer connected to the rectifier and the surge voltage controller to generate another ac voltage, wherein the surge voltage controller selects the first current path line according to the another ac voltage.

The foregoing and/or other aspects of the present invention may also be achieved by providing an electrical apparatus preventing power surges, comprising: a power supply to supply an ac voltage, the power supply including: a rectifier to convert the supplied ac voltage to a dc voltage, a first current path line connected between the power source and the rectifier, a second current path line connected between the power source and the rectifier, and a surge voltage controller selecting one of the first current path line and the second current path line as a current path from the power source to the rectifier according to the converted dc voltage value; and at least one electrical component to receive an output of the power supply.

In an aspect of the above embodiment, the first current path line comprises a switch turned on and off according to the dc voltage value.

In another aspect of the above embodiment, the second current path line comprises a switch causing a voltage drop between the power source and the rectifier.

In yet another aspect of the above embodiment, the power supply further comprises a transformer connected to the rectifier and the surge voltage controller to generate another ac voltage, wherein the surge voltage controller selects the first current path line according to the another ac voltage.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
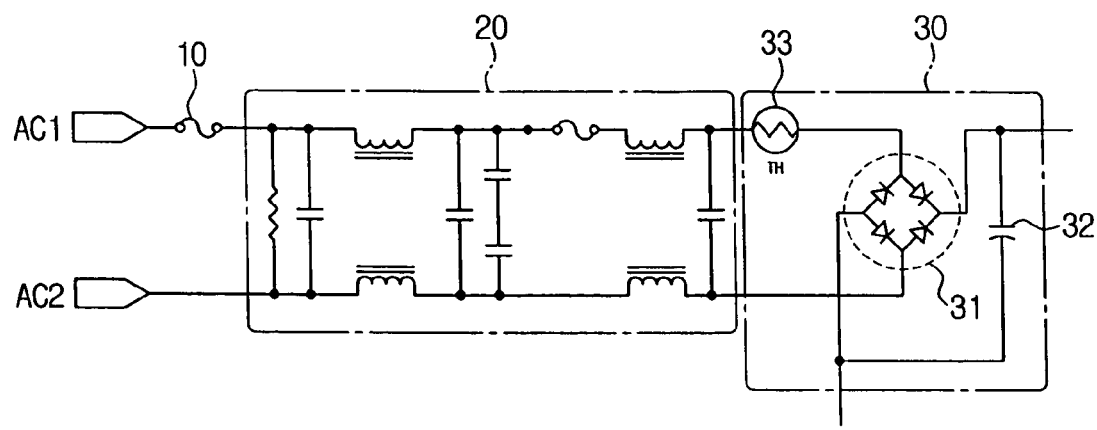
FIG. 1 is a detailed circuit diagram showing a conventional power supply.
Figure 2:
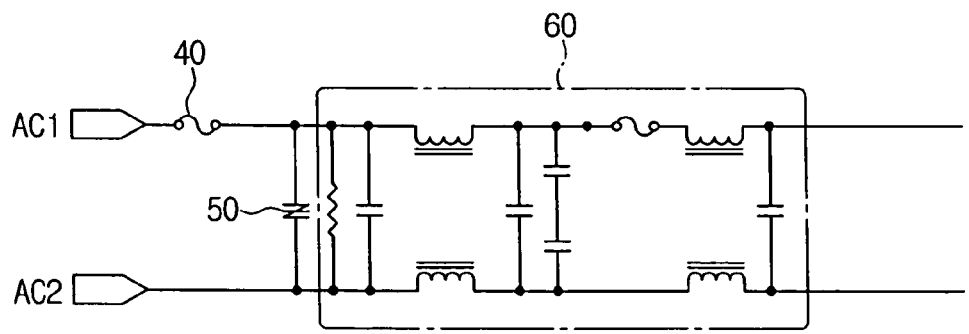
FIG. 2 is a detailed circuit diagram showing a power supply protection device formed at an input stage of a conventional power supply.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 3:
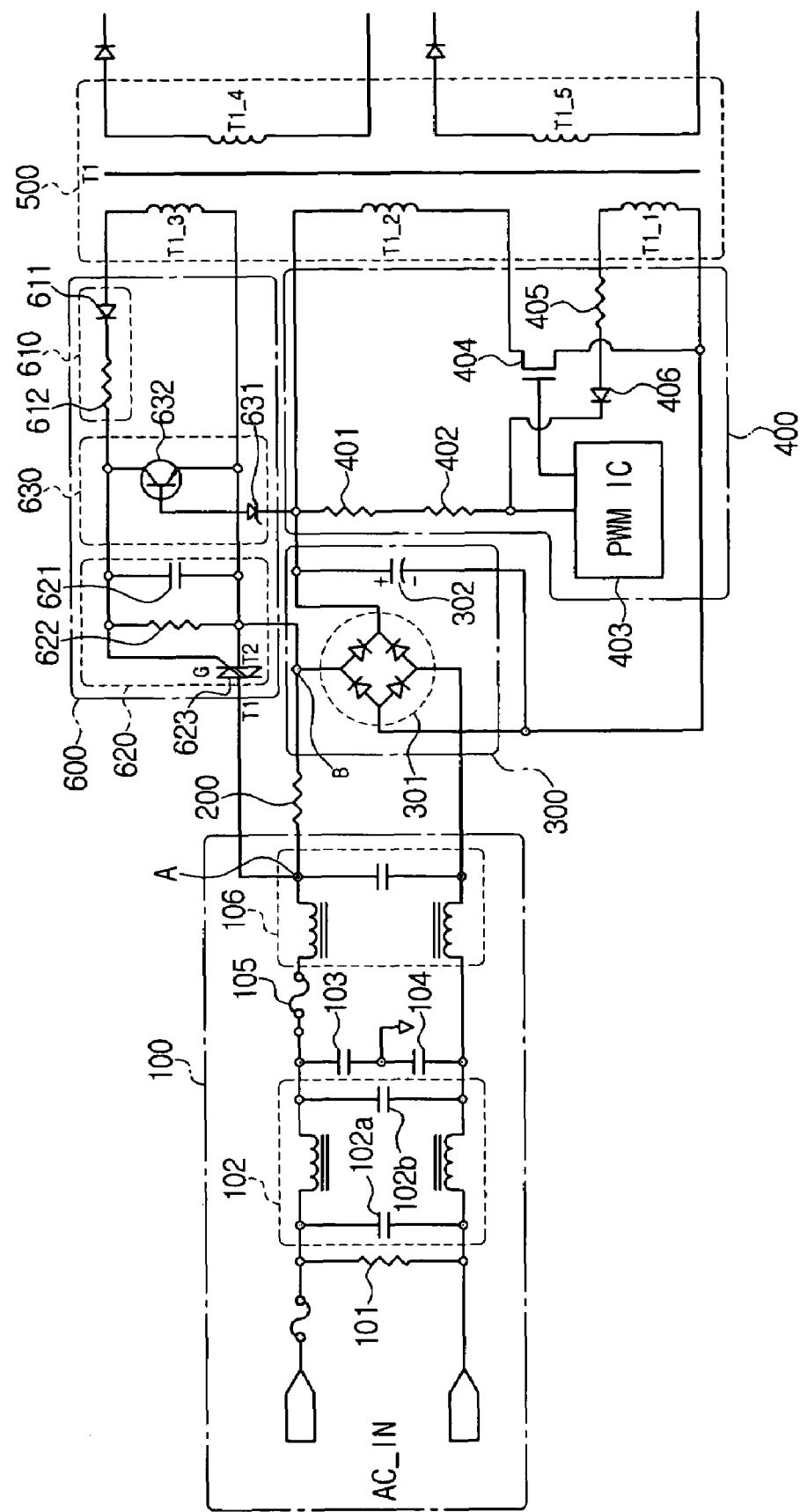
FIG. 3 is a detailed circuit diagram showing a power supply according to an embodiment of the present invention.

FIG. 3 is a detailed circuit diagram showing a power supply according to an embodiment of the present invention.

The power supply shown in FIG. 3 has a noise filter 100, a fuse resistor 200, a rectifier 300, a pulse generator 400, a transformer 500, and a surge voltage controller 600.

The noise filter 100 reduces noise induced in a voltage of an AC power source AC_IN. The voltage of the AC power source AC_IN has a frequency ranging from 50 Hz to 60 Hz, and the noise filter 100 eliminates frequencies lower or higher than this frequency range so as to reduce the noise induced in the voltage of the AC power source AC_IN.

The fuse resistor 200 is a resistor that becomes electrically open-circuited when a voltage exceeding a predetermined voltage value is applied thereto, and the fuse resistor 200 does not cause additional damage to the power supply since the fuse resistor 200 does not splash or scatter electrolyte or conductive fragments over the noise filter 100, the rectifier 300, the pulse generator 400, and/or the surge voltage controller 600.

The rectifier 300 rectifies a voltage of the AC power source AC_IN having noise reduced by the noise filter 100 and converts the rectified voltage into a dc voltage. The rectifier 300 includes a bridge diode 301 to rectify the voltage of the AC power source AC_IN and a capacitor 302 to smooth out the rectified voltage.

The pulse generator 400 is driven by the dc voltage converted in the rectifier 300, and generates a PWM (pulse width modulation) pulse having a frequency and a duty ratio based on predetermined values. The generated PWM pulse turns on and off the primary winding of the transformer 500 to induce predetermined ac voltages across secondary windings of the transformer 500.

The transformer 500 has one primary winding T1_2 and four secondary windings T1_1, T1_3, T1_4, and T1_5. The primary winding T1_2 is driven by the pulse generator 400 and induces a predetermined ac voltage across the secondary windings of the transformer 500. Here, the ac voltages induced across the secondary windings T1_1, T1_3, T1_4, and T1_5 are determined based on a winding ratio with respect to the primary winding T1_2.

The surge voltage controller 600 is turned on by an the voltage induced across the secondary winding T1_3 to form a first current path between the AC power source AC_IN and the rectifier 300 via the surge voltage controller 600, and, when an output voltage of the rectifier 300 exceeds a predetermined potential level, that is, when a surge voltage is applied, the surge voltage controller 600 changes the first current path to a second current path in which the voltage of the AC power source is applied to the rectifier 300 through the fuse resistor 200, to thereby disconnect the AC power source AC_IN. and the rectifier 300 from their connection to each other via the surcharge voltage controller 600. At this time, a voltage to open-circuit the fuse resistor 200 is made lower, by a certain amount of voltage, than the surge voltage.

It is an aspect of the present invention that the noise filter 100 has a damping resistor 101, a first LC filter 102, a second LC filter 106, a fuse 105, and capacitors 103 and 104.

The damping resistor 101 consumes current remaining on power lines when the AC power source AC_IN is cut off. At this time, the damping resistor 101 forms a current path with capacitors 102a and 102b provided in the first LC filter 102 to consume residual current.

The first and second LC filters 102 and 106 eliminate noise from the AC power source AC_IN having a frequency range of 50 Hz~60 Hz, that is, frequencies lower or higher than the frequency range of the AC power source AC_IN.

The fuse 105 prevents a voltage of the AC power source AC_IN from being applied to the inside of the power supply in the case where a potential level of the AC power source AC_IN through the first LC filter 102 is excessively high.

The capacitors 103 and 104 are bypass capacitors, which discharge to a ground high-frequency noise introduced into the AC power source AC_IN.

Here, the rectifier 300 has a bridge diode 301 and a capacitor 302. The bridge diode 301 rectifies a voltage of the AC power source noise-eliminated by the noise filter 100. The capacitor 302 smoothes and converts a rectified ac voltage into a complete dc voltage.

As illustrated in FIG. 3, the pulse generator 400 has resistors 401, 402, and 405, a PWM IC 403, and a diode 406. The resistors 401 and 402 limit current from the dc voltage outputted from the rectifier 300, and then provide a driving voltage to the PWM IC 403. At this point, the current provided to the PWM IC 403 passes through the two resistors 401 and 402 so that an electric power value for each of the resistors 401 and 402 is low. That is, one resistor may be used, but, in order to reduce stress applied to the resistor, the two resistors 401 and 402 are used here to reduce the current flow.

The PWM IC 403 is driven by a dc voltage applied through the resistors 401 and 402, and generates a PWM pulse having a predetermined frequency and duty ratio. The generated PWM pulse is applied to the gate of an NMOS 404, and the NMOS 404 turns on and off the primary winding T12 of the transformer 500 according to the PWM pulse to thereby induce predetermined ac voltages across the second windings, for example, T1_1, T1_3, T1_4, and T1_5, of the transformer 500.

The diode 406 forms a current path between a positive voltage and a negative voltage that are outputted from the rectifier 300 together with the secondary winding T11. At this time, since the diode 406 has a high resistance in the reverse direction, the potential level of the dc voltage applied to the PWM IC 403 is not changed.

Here, the surge voltage controller 600 has a voltage generator 610, a first switch 620, and a second switch 630.

The voltage generator 610 half-wave-rectifies an ac voltage induced across the secondary winding T13 of the transformer 500 when the power supply operates to generate a predetermined dc voltage.

The first switch 620 is turned on by the dc voltage supplied from the voltage generator 610 to form the first current path, where the voltage of the AC power source AC_IN is applied to a node A, such that the current is not applied to the fuse resistor 200 and does not flow through the second current path. Accordingly, the fuse resistor 200 provides a path, e.g., the second current path, for the voltage of the AC power source to be applied to the rectifier 300 only at the time the power supply is initially turned on, and, if the first switch 620 is driven, the voltage of the AC power source AC_IN is not supplied to the rectifier 300 via the fuse resistor 200, and the second path is bypassed.

After the first switch 620 is turned on, the second switch 630 will turn off the first switch 620 when an output voltage of the rectifier 300 exceeds a predetermined value, to thereby lead the voltage of the AC power source AC_IN to the fuse resistor 200 so that the fuse resistor 200 becomes open-circuited.

As illustrated in FIG. 3, the voltage generator 610 may include components such as, for example, a diode 611 and a resistor 612. However, other component combinations may be used as an alternative which will provide the desired operation of the voltage generator 610.

The diode 611 rectifies an ac voltage induced across the secondary winding T1_3 of the transformer 500. The present invention as illustrated FIG. 3 presents the half-wave rectification by use of one diode 611, but, in addition, can be implemented to provide a full-wave rectification.

The resistor 612 restrains current due to a dc voltage rectified through the diode 611.

Here, the first switch 620 has a capacitor 621, a resistor 622, and a triac 623. However, other component combinations may be used as an alternative which will provide the desired operation of a switch as provided by switch 620.

The capacitor 621 is charged with the dc voltage applied through the resistor 612 so as to prevent the dc voltage applied through the resistor 612 from being abruptly applied to the triac 623. Accordingly, a potential level of the dc voltage applied to a gate G of the triac 623 slowly increases to thereby prevent the triac 623 from being damaged.

The resistor 622 consumes residual current between the gate G of the triac 623 and an output terminal T2 when the ac voltage is not induced across the second winding T13 of the transformer 500, that is, when the power supply is turned off. At this time, the residual current is consumed via a current path formed with the resistor 622, the diode 611, and the resistor 612.

The triac 623 is turned on with the dc voltage applied to its gate G from the voltage generator 610 so that the first current path is formed between the node A and a node B. Accordingly, the voltage of the AC power source AC_IN outputted from the noise filter 100 is applied to the rectifier 300 through the triac 623 rather than through the fuse resistor 200. The turn-on resistance of the triac 623 is close to $0\Omega$, so that the second current path is not formed through the fuse resistor 200 having a predetermined resistance value of, for example, $10\omega$.

Here, the second switch 630 has a zener diode 631 and a bipolar transistor 632. A cathode of the zener diode 631 is connected to an output terminal of the positive(+) voltage of the rectifier 300, and an anode of the zener diode 631 is connected to a base of the bipolar transistor 632. It is an aspect of the present invention that the zener diode 631 has as a breakdown voltage value that is the same as a value of the voltage at the time the positive voltage outputted from the rectifier 300 is a surge voltage. For example, provided that an output voltage of 10V is a surge voltage state, it is an aspect that the breakdown voltage of the zener diode is 10V.

If the output voltage of the rectifier 300 reaches the surge voltage state, the zener diode 631 develops the breakdown phenomenon so that the output voltage of the rectifier 300 is applied to the base of the bipolar transistor 632. Therefore, the bipolar transistor 632 is turned on to form a current path together with the voltage generator 610, and the positive voltage is not applied to the gate G of the triac 623, so that the triac 623 is turned off. Accordingly, a voltage of the AC voltage source AC_IN being applied to the node A is applied to the node B through the fuse resistor 200 and through the second current path. At this time, the surge voltage state of the output voltage of the rectifier 300 indicates that a voltage of the AC power source AC_IN is in the surge voltage state, which causes the fuse resistor 200 to be open-circuited. Due to the open-circuit of the fuse resistor 200, components constituting the rectifier 300 and the pulse generator 400 receive less stress from a voltage of the AC power source in the surge voltage state, so the components constituting the power supply are not damaged.

Figure 4:
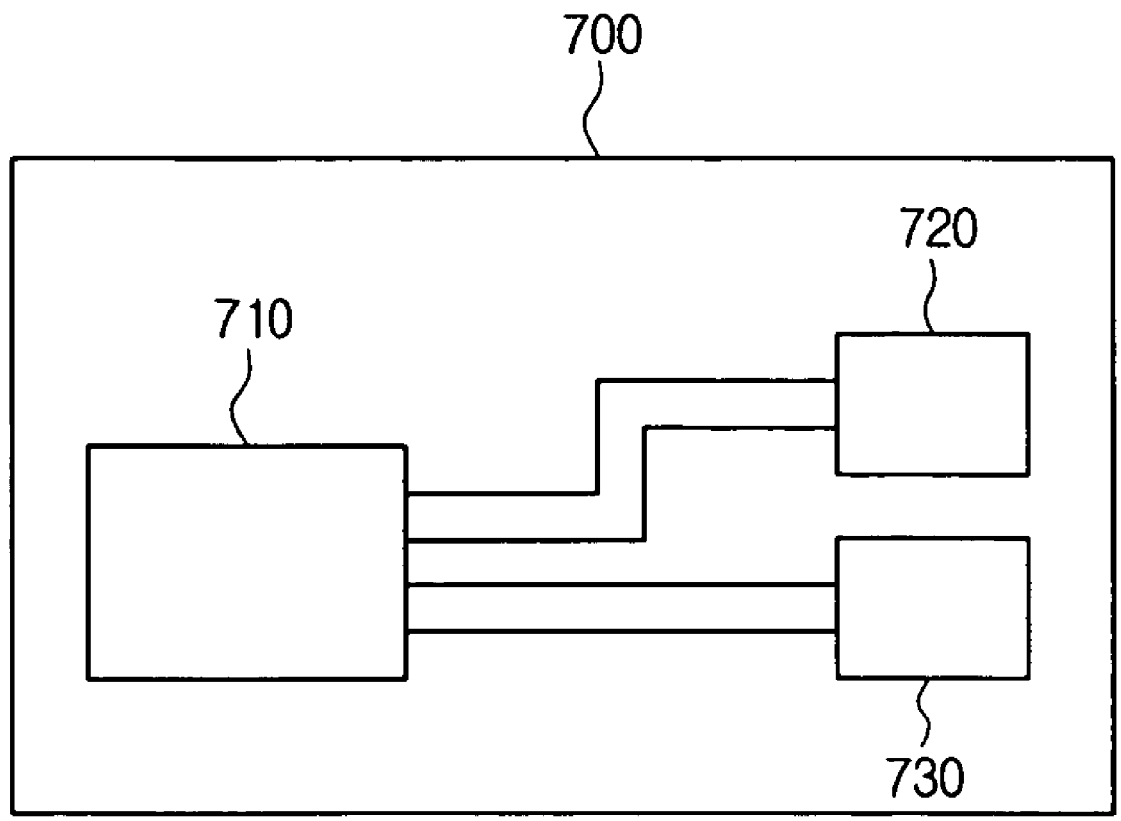
FIG. 4 is an electrical apparatus having a power supply suppling an ac voltage, according to another embodiment of the present invention.

FIG. 4 illustrates an electrical apparatus 700 according to another embodiment of the present invention. The electrical apparatus 700 includes a power supply 710 supplying an ac voltage according to the power supply illustrated in FIG. 3. The electrical apparatus further includes electrical components 720 and 730 in which the power is supplied to from the power supply 710. Since the power supply 710 is protected from a surge voltage, as described above with reference to FIG. 3, the electrical components 720 and 730 of the electrical apparatus 700 can receive the power stably from the power supply 710.

As stated above, the present invention does not cause the loss of parts constituting the power supply due to a voltage of the AC power source being in surge voltage state. Further, the present invention does not cause a problem of damaging neighboring parts due to explosion of parts such as capacitors or varistors as in the prior art, as well as facilitates instant surge voltage cut-off with the use of semiconductor devices such as the triac as a switching element.

Although the embodiments of the present invention have been shown and described, it will be appreciated by those skilled in the art that changes may be made in the embodiments without departing from the principles and spirit of the invention, the scope of which is defined in the appended claims and their equivalents.

What is claimed is:
1. A power supply with surge voltage control functions, comprising:
 a rectifying unit to rectify a voltage of an AC power source externally applied;

a fuse resistor to input and apply the AC power source to the rectifying unit, and to cut off the voltage of the AC power source exceeding a predetermined AC value;

a pulse generation unit driven by an output voltage of the rectifying unit, and to generate a pulse having a predetermined period;

a transformer driven by the pulse, and to induce a predetermined ac voltage; and a surge voltage control unit turning on by the ac voltage induced by the transformer to form a first current path between the AC power source and the rectifying unit via the surge voltage control unit, wherein a second current path is formed between the AC power source and the rectifying unit via the fuse resistor when the output voltage of the rectifying unit exceeds a predetermined DC value.

2. The power supply as claimed in claim 1, wherein the surge voltage control unit includes:

a voltage generator to generate a dc voltage from the ac voltage induced by the transformer;

a first switch to form the first current path between the AC power source and the rectification unit by the dc voltage; and a second switch to turn off the first switch when the output voltage of the rectification unit exceeds the predetermined DC value and to form the second current path between the AC power source and the rectifying unit via the fuse resistor.

3. The power supply as claimed in claim 2, wherein the voltage generator includes:

windings formed at a secondary side of the transformer;

a first diode having an anode connected to one end of one winding of the windings; and a first resistor having one end connected to a cathode of the first diode and another end which forms a positive (+) voltage output terminal.

4. The power supply as claimed in claim 3, wherein the first switch includes:

a triac having:

an input terminal connected to the AC power source, an output terminal connected to another end of one winding formed at the secondary side of the transformer, and a gate connected to the positive voltage output terminal; and a second resistor and a first capacitor each connected between the gate and the output terminal of the triac.

5. The power supply as claimed in claim 4, wherein the second switch includes:

a bipolar transistor having:

a collector connected between the gate of the triac and the voltage generator, and an emitter connected to the output terminal of the triac; and a zener diode having:

an anode connected to a base of the bipolar transistor, and a cathode connected to a voltage output terminal of the rectification unit.

6. The power supply as claimed in claim 4, wherein the second resistor is a damping resistor to consume residual current between the output terminal and the gate of the triac in a state in which the triac is turned off.

7. The power supply as claimed in claim 4, wherein the first capacitor delays time at which an output voltage of the voltage generator is applied to the gate of the triac.

8. The power supply as claimed in claim 5, further comprising LC filters provided between the AC power source and the rectifying unit, and to reduce noise included in the voltage of the AC power source.

9. A power supply comprising:

a rectifying unit to rectify an externally applied AC power source;

a switching unit to apply the AC power source to the rectifying unit through a first electrical path until the AC power source exceeds a predetermined AC value, and then to cut off the AC power source to the rectifying unit;

a pulse generation unit to generate a pulse having a predetermined period and being driven by an output voltage of the rectifying unit;

a transformer driven by the generated pulse to induce a predetermined ac voltage; and a surge voltage control unit to form a second electrical path for a current to flow from the AC power source to the rectifying unit when turned on by the induced predetermined ac voltage, the current flowing from the AC power source to the rectifying unit through the first electrical path when the output voltage of the rectifying unit exceeds a predetermined DC value.

10. The power supply as claimed in claim 9, wherein the surge voltage control unit includes:

a voltage generator to generate a dc voltage from the ac voltage induced by the transformer;

a first switch to form a current path between the AC power source and the rectification unit by the dc voltage; and a second switch to turn off the first switch when the output voltage of the rectification unit exceeds the predetermined DC value and to form the current path between the AC power source and the rectifying unit via the switching unit.

11. A method of providing surge voltage protection to a power supply, comprising:

rectifying a voltage of an externally applied AC power source received through a first electrical path;

cutting off the voltage of the AC power source if the voltage exceeds a predetermined AC value;

generating a pulse of a predetermined period from the rectified voltage;

inducing a predetermined ac voltage by the generated pulse; and switching the first electrical path to a second electrical path between the AC power source and the rectifying operation to provide current to the rectifying operation through the second electrical path when an output voltage of the rectifying operation exceeds a predetermined DC value, and returning the flow of the current from the AC power source to the rectifying operation through the first electrical path when the output voltage of the rectifying operation does not exceed the predetermined DC value.

12. A power supply, comprising:

a power source generating an ac voltage;

a rectifier connected to the power source to convert the ac voltage to a dc voltage;

a first current path line connected between the power source and the rectifier to provide a first ac voltage value to the rectifier, the first ac voltage value being at substantially like amplitude as that provided by the power source;

a second current path line connected between the power source and the rectifier to provide a second ac voltage value to the rectifier that is lower than the first voltage value and to remove current from the rectifier if the second ac voltage value exceeds a predetermined voltage value; and a surge voltage controller selecting one of the first current path line and the second current path line as a current path from the power source to the rectifier according to the dc voltage value.

13. The power supply as claimed in claim 12, wherein the first current path line comprises a switch turned on and off according to the dc voltage value.

14. The power supply as claimed in claim 12, wherein the second current path line comprises a switch causing a voltage drop between the power source and the rectifier.

15. The power supply as claimed in claim 12, further comprising a transformer connected to the rectifier and the surge voltage controller to generate another ac voltage, wherein the surge voltage controller selects the first current path line according to the another ac voltage.

16. An electrical apparatus to prevent damage caused by a power surge, comprising:

a power supply to supply an ac voltage;

a rectifier to convert the supplied ac voltage to a dc voltage;

a first current path line connected between the power supply and the rectifier to provide a first ac voltage value to the rectifier, the first ac voltage value being at substantially like amplitude as that provided by the power supply;

a second current path line connected between the power supply and the rectifier to provide a second ac voltage value to the rectifier that is lower than the first ac voltage value and to remove current from the rectifier if the second ac voltage value exceeds a predetermined voltage value;

a surge voltage controller selecting one of the first current path line and the second current path line as a current path from the power supply to the rectifier according to the converted dc voltage value; and at least one electrical component to receive an output of the power supply.

17. The electrical apparatus as claimed in claim 16, wherein the first current path line comprises a switch turned on and off according to the dc voltage value.

18. The electrical apparatus as claimed in claim 16, wherein the second current path line comprises a switch causing a voltage drop between the power supply and the rectifier.

19. The electrical apparatus as claimed in claim 16, further comprising a transformer connected to the rectifier and the surge voltage controller to generate another ac voltage, wherein the surge voltage controller selects the first current path line according to the another ac voltage.

20. A power supply comprising:

a power source generating an ac voltage;

a rectifier connected to the power source through a fuse resistor to convert the ac voltage to a dc voltage; and a surge voltage controller to receive the dc voltage from the rectifier and to select a first or second mode of operation based on the received dc voltage, wherein the surge voltage controller bypasses the fuse resistor to provide the ac voltage to the rectifier in the first mode of operation, and provides the ac voltage from the power source and to the rectifier via the fuse resistor in the second mode of operation.

21. The power supply of claim 20, wherein the ac voltage provided from the power source to the rectifier in the first mode of operation has a first voltage value, and the ac voltage flowing between the power source and the rectifier via the fuse resistor in the second mode of operation has a second voltage value that is lower than the first voltage value.

22. A power supply, comprising:

an ac power source to provide an ac voltage;

a rectifier to produce a dc voltage from the ac voltage;

a first current path electrically interposed between the ac power source and the rectifier, the first current path to provide the ac voltage to the rectifier at substantially like amplitude as provided by the ac power source;

a second current path electrically interposed between the ac power source and the rectifier, the second current path being electrically in parallel with the first current path;

a fuse resistor in the second current path to remove the ac voltage from the rectifier responsive to a voltage drop across the fuse resistor exceeding a predetermined value; and a surge voltage controller to direct current through only the second current path responsive to the dc voltage being above a predetermined voltage level and to direct current through the first current path otherwise.

* * * * *